United States Patent
An

(10) Patent No.: US 9,810,116 B2
(45) Date of Patent: Nov. 7, 2017

(54) OIL SEPARATOR

(71) Applicant: HYUNDAI MOTOR COMPANY, Seoul (KR)

(72) Inventor: Deog Byoung An, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 141 days.

(21) Appl. No.: 14/841,604

(22) Filed: Aug. 31, 2015

(65) Prior Publication Data
US 2016/0138443 A1 May 19, 2016

(30) Foreign Application Priority Data
Nov. 13, 2014 (KR) .......................... 10-2014-0157923

(51) Int. Cl.
| | |
|---|---|
| *B01D 45/00* | (2006.01) |
| *F01M 13/04* | (2006.01) |
| *B01D 45/08* | (2006.01) |
| *B01D 45/16* | (2006.01) |
| *F01M 13/00* | (2006.01) |

(52) U.S. Cl.
CPC .............. *F01M 13/04* (2013.01); *B01D 45/08* (2013.01); *B01D 45/16* (2013.01); *F01M 2013/0016* (2013.01); *F01M 2013/045* (2013.01); *F01M 2013/0422* (2013.01); *F01M 2013/0427* (2013.01)

(58) Field of Classification Search
CPC .......... F01M 13/04; F01M 2013/0422; F01M 2013/0427; F01M 2013/045; F02M 3013/0016; B01D 45/08; B01D 45/16

USPC ....................................... 123/572–574, 41.86
See application file for complete search history.

(56) References Cited

U.S. PATENT DOCUMENTS

| | | | | |
|---|---|---|---|---|
| 4,409,950 | A * | 10/1983 | Goldberg | F01M 13/022 123/572 |
| 5,450,835 | A * | 9/1995 | Wagner | F01M 13/04 123/573 |
| 5,617,834 | A * | 4/1997 | Lohr | F02B 75/22 123/572 |
| 6,309,436 | B1 * | 10/2001 | Holch | B01D 46/0024 123/198 E |

(Continued)

FOREIGN PATENT DOCUMENTS

| | | |
|---|---|---|
| JP | 2002276328 A | 9/2002 |
| JP | 2012057496 A | 3/2012 |

(Continued)

*Primary Examiner* — Marguerite McMahon
(74) *Attorney, Agent, or Firm* — McDermott Will & Emery LLP

(57) ABSTRACT

An oil separator includes a housing into which mixed gas in which unburned gas and engine oil are mixed with each other is introduced from a crank case; a centrifuge mounted in the housing and generating centrifugal force to the mixed gas to thereby separate the engine oil from the mixed gas; and a filter separator mounted in the housing and filtering the engine oil in the mixed gas. Since the engine oil is primarily separated through the centrifuge and secondarily separated through the filter separator, engine oil separation efficiency is improved as compared to the related art, and the same amount of gas may be treated even with a small size as compared to the related art.

18 Claims, 5 Drawing Sheets

(56) References Cited

U.S. PATENT DOCUMENTS

| | | | | |
|---|---|---|---|---|
| 7,850,754 B2* | 12/2010 | Ruppel | ............... | F01M 13/04 55/315 |
| 8,051,844 B2* | 11/2011 | Clark | ............... | B01D 46/30 123/572 |
| 2002/0023629 A1* | 2/2002 | Geiger | ............... | F01M 13/04 123/568.11 |
| 2006/0075998 A1* | 4/2006 | Shieh | ............... | B01D 45/16 123/573 |
| 2006/0090737 A1* | 5/2006 | Pietschner | ............ | F01M 13/04 123/572 |
| 2011/0146639 A1* | 6/2011 | Martinengo | ............ | F01M 13/00 123/573 |
| 2015/0007532 A1* | 1/2015 | Kira | ............... | B01D 45/12 55/447 |
| 2015/0337697 A1* | 11/2015 | Kira | ............... | F01M 13/04 123/41.86 |
| 2015/0354420 A1* | 12/2015 | Kira | ............... | F02F 7/006 123/574 |

FOREIGN PATENT DOCUMENTS

| | | |
|---|---|---|
| JP | 2013096236 A | 5/2013 |
| KR | 20-1998-0019744 U | 7/1998 |
| KR | 10-2005-0034791 A | 4/2005 |
| KR | 10-2010-0011757 A | 2/2010 |
| KR | 101382080 B1 | 4/2014 |

\* cited by examiner

OIL SEPARATOR

CROSS-REFERENCE TO RELATED APPLICATION

This application is based on and claims the benefit of priority to Korean Patent Application No. 10-2014-0157923, filed on Nov. 13, 2014 in the Korean Intellectual Property Office, the disclosure of which is incorporated herein in its entirety by reference.

TECHNICAL FIELD

The present disclosure relates to an oil separator, and more particularly, to an oil separator separating engine oil from mixed gas in which unburned gas discharged from the inside of an engine crank case and engine oil are mixed with each other in order to maintain internal pressure of the engine crank case.

BACKGROUND

In general, in order to adjust internal pressure of a crank case positioned at a lower end portion of an engine, gas is discharged from the crank case to the outside. The gas discharged from the crank case to the outside is in a state in which combustion gas injected into a combustion chamber of an engine to thereby be combusted, unburned gas, and engine oil protecting a cylinder, a piston, and a crank shaft are mixed with each other.

When gas in which the engine oil and the unburned gas are mixed with each other is continuously discharged to the outside, an exchange period required to change the engine oil is shortened, which may have a negative influence on maintenance of a vehicle and fuel efficiency.

Therefore, according to the related art, as illustrated in FIGS. 1 and 2, an oil separator 1 according to the related art separated engine oil from gas G discharged from a crank case to the outside to re-inject the separated engine oil into an oil pan 2 provided in an engine. In this case, gas from which the engine oil was separated was re-circulated into an intake manifold 3 so as to assist in improving fuel efficiency.

However, as illustrated in FIG. 2, a size of the oil separator 1 separating the oil from the gas discharged from the crank case according to the related art has been continuously increased in order to increase an amount of treated gas and engine oil separation efficiency, such that it has been difficult to secure a space for mounting the oil separator 1 in the engine, and an internal structure became complicated. Therefore, it was difficult to manufacture the engine, a manufacturing cost was increased, and a weight was increased, which had a negative influence on fuel efficiency.

RELATED ART DOCUMENT

Patent Document (Patent Document 1) Korean Patent Publication No. 10-1382080 (Apr. 14, 2014)

SUMMARY

The present disclosure has been made to solve the above-mentioned problems occurring in the prior art while advantages achieved by the prior art are maintained intact.

An aspect of the present disclosure provides an oil separator of which a size is decreased as compared to the related art.

According to an exemplary embodiment of the preset disclosure, an oil separator includes a housing into which mixed gas in which unburned gas and engine oil are mixed with each other is introduced from a crank case; a centrifuge mounted in the housing and generating centrifugal force to the mixed gas to thereby separate the engine oil from the mixed gas; and a filter separator mounted in the housing and filtering the engine oil in the mixed gas.

According to another exemplary embodiment of the preset disclosure, an oil separator includes an oil discharge pipe extending along a first direction; a gas discharge pipe extending along a second direction different to the first direction; a separation chamber including a first through hole connected to the oil discharge pipe and a second through hole connected to the gas discharge pipe, and extending along the first direction; an introduction pipe protruding from a side wall of the separation chamber; a centrifuge disposed in the separation chamber and including a plurality of ribs protruding from a bottom wall in which the first through hole is formed; and a filter including a plurality of fine through holes and disposed between the centrifuge and the second through hole.

The oil separator may further include a curved flow path connected between the second through hole of the separation chamber and the gas discharge pipe.

The oil separator may further include a movable diaphragm positioned between the gas discharge pipe and the curved flow path and selectively opening and closing a flow path between the curved flow path and the gas discharge pipe.

The oil separator may further include a cap fixing a position of the movable diaphragm.

The oil separator may further include a flow guide protruding from an edge of the second through hole of the separation chamber toward the filter.

The plurality of ribs may at least include a straight rib extending from the side wall of the separation chamber from which the introduction pipe protrudes, and a curved rib extending from the straight rib and forming a spiral shape together with the straight rib. The first through hole of the separation chamber may be surrounded by the plurality of ribs.

The filter may include a cover plate body having an edge connected to the side wall of the separation chamber and a central part having a truncated cone shape, and the plurality of fine through holes penetrating through the cover plate body along directions intersecting the side wall of the separation chamber.

The introduction pipe may protrude from a portion of the side wall which is closer to the first through hole than the second through hole of the separation chamber.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION

An exemplary embodiment of the present disclosure will be described in detail with reference to the accompanying drawings.

Figure 1:
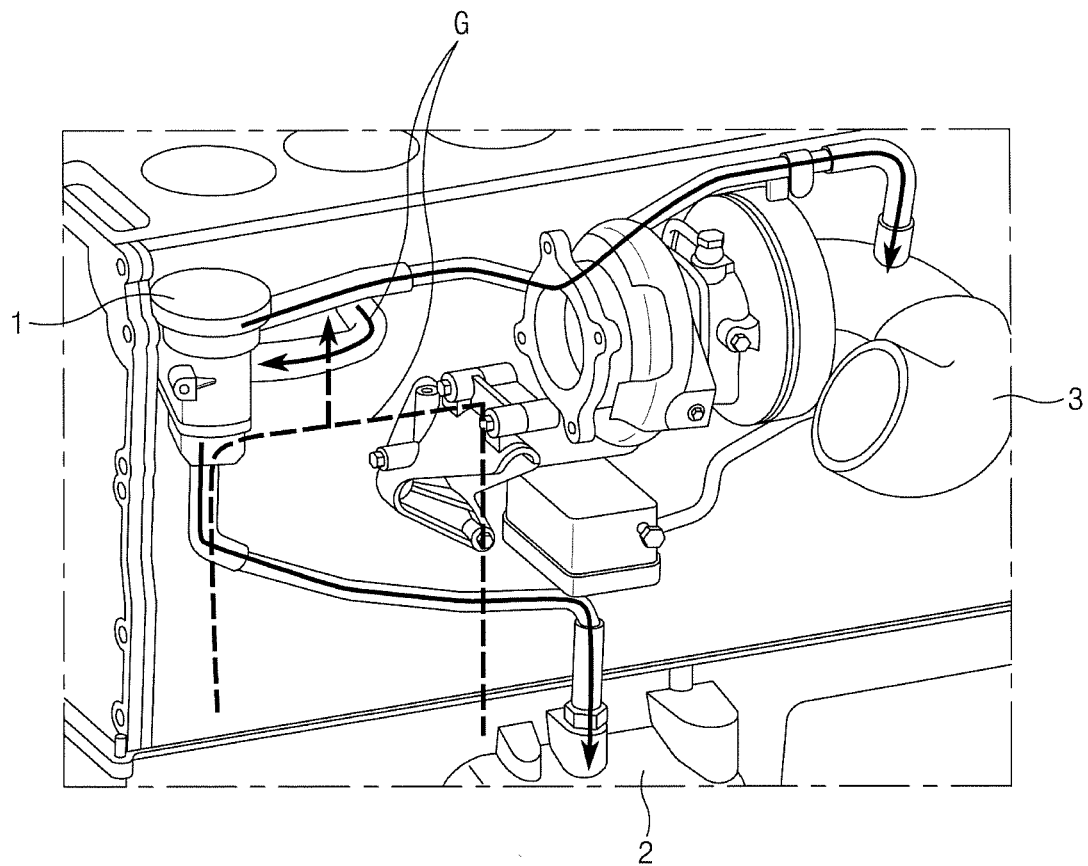
FIG. 1 is an exemplary view illustrating a mounting state in which an oil separator is mounted in an engine according to the related art.
Figure 2:
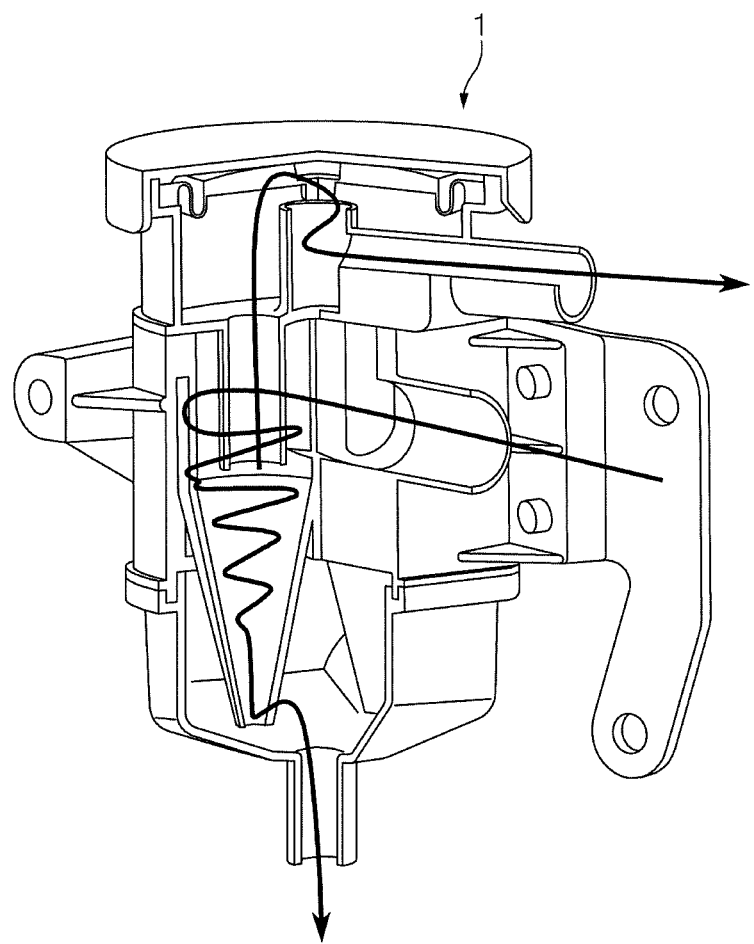
FIG. 2 is a perspective view of an oil separator according to the related art.
Figure 3:
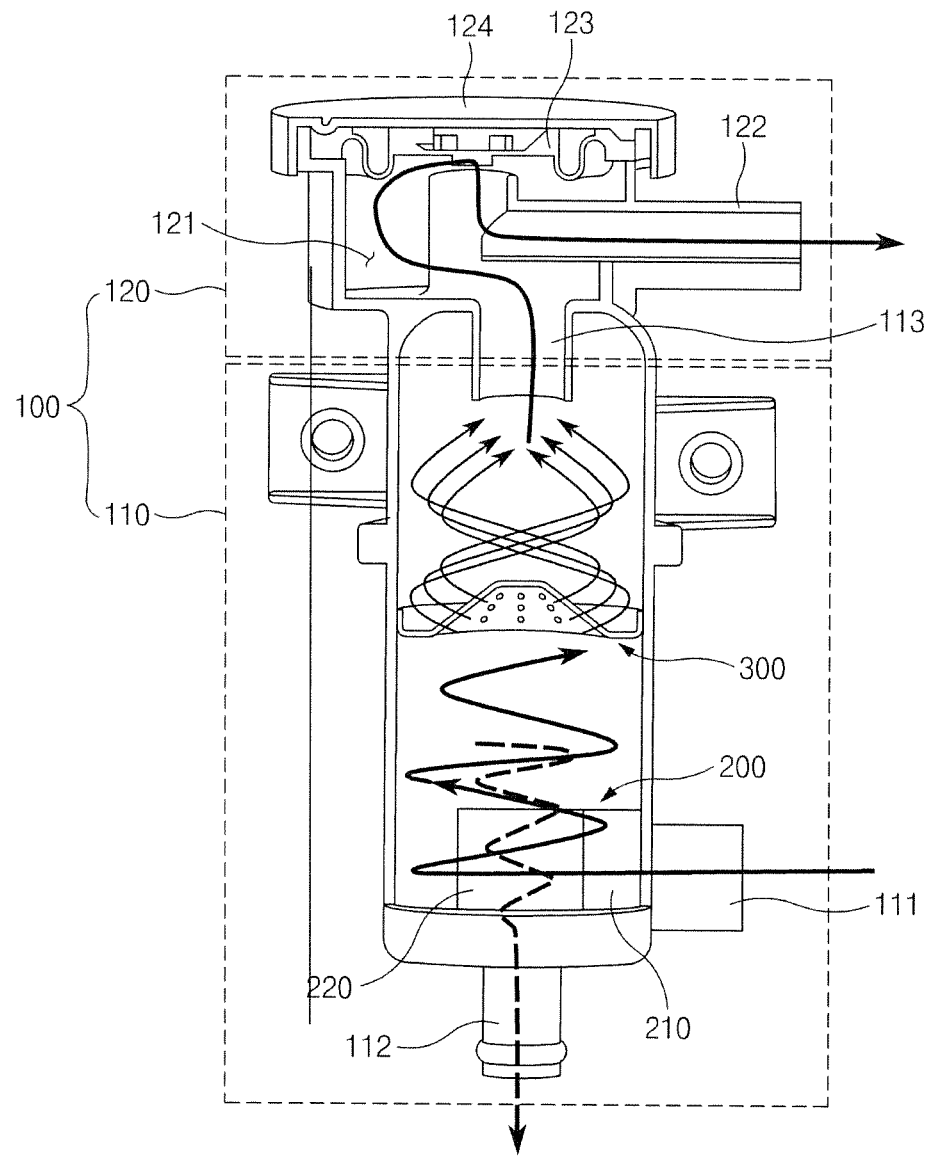
FIG. 3 is a cross-sectional view of an oil separator according to an exemplary embodiment of the present disclosure.
Figure 4:
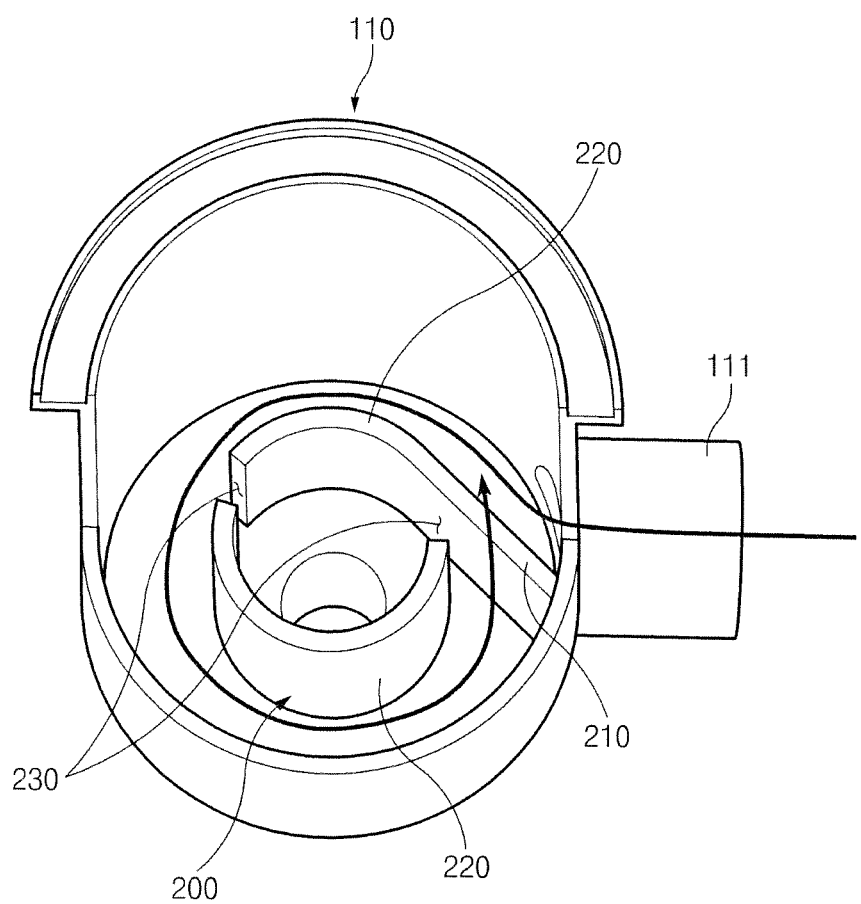
FIG. 4 is a main portion perspective view of the oil separator of FIG. 3.
Figure 5:
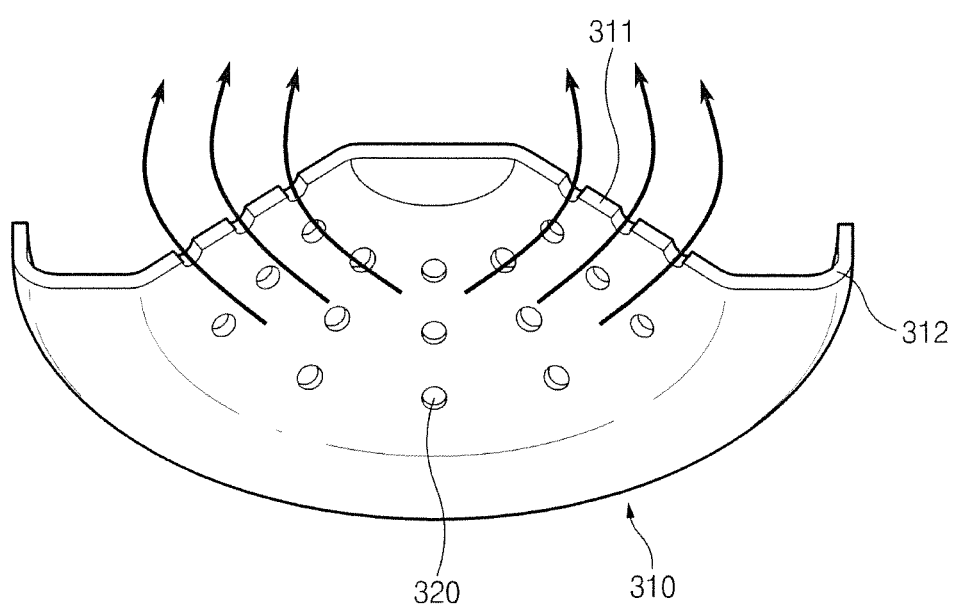
FIG. 5 is a perspective view of a filter separator provided in the oil separator of FIG. 3.

As illustrated in FIGS. 3 to 5, an oil separator according to the present disclosure includes a housing 100 into which mixed gas of unburned gas and engine oil is introduced from a crank case, a centrifuge 200 mounted in the housing 100 and generating centrifugal force to the mixed gas to thereby separate the engine oil from the mixed gas, and a filter separator 300 mounted in the housing 100 and filtering the engine oil in the mixed gas.

The housing 100 includes a separation function part 110 in which the centrifuge 200 and the filter separator 300 are mounted and a discharge part 120 discharging the unburned gas separated from the mixed gas.

The separation function part 110 has a cylindrical shape and includes an introduction pipe 111 attached to a side surface of the separation function part 110 so that the mixed gas is introduced, an oil discharge pipe 112 attached to a bottom surface of the separation function part 110 so that the engine oil separated from the mixed gas is discharged, and a flow guide 113 inducing the unburned gas separated from the mixed gas to the discharge part 120 and protruding toward the inside of the separation function part 110.

The discharge part 120 has a box shape in which an upper surface thereof is opened, and includes a curved path 121 extending from the flow guide 113 formed in the separation function part 110 toward the upper surface of the discharge part 120, a gas discharge part 122 protruding from a side surface of the discharge part 120 and bent to thereby extend toward the upper surface of the discharge part 120, and a movable diaphragm 123 positioned on the upper surface of the discharge part 120 so as to allow the curved path 121 and the gas discharge pipe 122 to be in communication with each other or be blocked from each other. The diaphragm 123 is manufactured so that the curved path 121 and the gas discharge pipe 122 are in communication with each other when a predetermined amount of unburned gas is introduced into the curved path 121. The discharge part 120 further includes a cap 124 fastened to the opened upper surface so as to fix a position of the diaphragm 123.

As illustrated in FIG. 4, the centrifuge 200 includes an induction rib formed in the housing 100 so as to induce the mixed gas toward an inner side wall surface of the housing 100.

The induction rib includes a straight rib 210 extending from the introduction pipe 111 attached to the housing 100 toward the inner side wall surface of the housing 100, and a curved rib 220 extending from the straight rib 210 so as to be curved to thereby form a spiral shape together with the straight rib 210.

In addition, the induction rib further includes a through hole 230 formed to penetrate therethrough in a width direction of the induction rib so that the engine oil separated from the mixed oil is moved to the oil discharge pipe 112 provided in the housing 100 by friction with the inner side wall surface of the housing 100.

As illustrated in FIG. 5, the filter separator 300 includes a cover plate body 310 having an edge 312 connected to the inner side wall surface of the housing 100 and a plurality of fine through holes 320 formed in the cover plate body 310.

The cover plate body 310 includes a central part 311 protruding in a truncated cone shape. The central part 311, if extended, intersects the inner side wall surface, and the edge 312 extends while being curved to thereby be parallel with the inner side wall surface.

In the oil separator according to the present disclosure configured as described above, the mixed gas in which the unburned gas and the engine oil are mixed with each other is introduced to a side surface of the housing 100 through the introduction pipe 111 provided in the side surface of the housing 100, and the engine oil is separated from the mixed gas in twice through the centrifuge 200 and the filter separator positioned over the centrifuge. Therefore, engine oil separation efficiency is increased as compared to the related art. Further, since the filter separator is positioned over the centrifuge 200, such that a volume may be minimized.

The mixed gas introduced into the introduction pipe 111 is moved toward the inner side wall surface of the housing 100 by the induction rib and rotates while coming in contact with the inner side wall surface of the housing 100 along a cross-sectional shape of the inner side wall surface of the housing 100 in a width direction. In this case, the engine oil of which a viscosity is higher than that of the unburned gas is stagnant at the inner side wall surface to thereby be primarily separated from the mixed gas. After introduction of the mixed gas into the housing 100 is stopped, the engine oil is discharged from the housing 100 to the oil pan through the through hole 230 formed in the induction rib.

In addition, the mixed gas that is relatively light is moved toward the filter separator positioned over the centrifuge 200. In this case, the engine oil of which a particle size is relatively large does not pass through the fine through holes 320 but is condensed on the cover plate body.

The engine oil condensed on the cover plate body flows down along the cover plate body 310 having the truncated cone shape to thereby drop toward the centrifuge 200 after introduction of the mixed gas into the housing 100 is stopped, and finally, the engine oil is discharged from the housing 100 to the oil pan through the oil discharge pipe.

The mixed gas from which the engine oil passing through the fine through holes 320 is secondarily separated is introduced into the discharge part 120 through the flow guide, and in the case in which a predetermined amount of gas is collected to generate pressure of a predetermined value or more, a shape of the diaphragm blocking the curved path 121 and the gas discharge pipe 122 from each other is changed, such that the curved path 121 and the gas discharge pipe 122 are in communication with each other. The mixed gas in which the engine oil is removed in twice is exhausted to an intake manifold through the gas discharge pipe.

As described above, in the oil separator according to the exemplary embodiment of the present disclosure, since the engine oil is primarily separated through the centrifuge and secondarily separated through the filter separator again, engine oil separation efficiency is increased as compared to the related art, and the same amount of gas may be treated even with a small size as compared to the related art.

Further, since the same amount of gas may be treated with a small size as compared to the related art, a size of a space that should be secured in the engine for mounting the oil separator is decreased, which assists in design a layout of the engine.

In addition, since the oil separator has a small size and a simple structure as compared to the related art, a manufacturing cost may be decreased, and lightness may be implemented.

In addition, the oil separator finally has a good influence on fuel efficiency of a vehicle through lightness.

As described above, although the present disclosure has been described with reference to exemplary embodiments and the accompanying drawings, it would be appreciated by those skilled in the art that the present disclosure is not limited thereto but various modifications and alterations might be made without departing from the scope defined in the claims to be provided below and their equivalents.

What is claimed is:

1. An oil separator comprising:
   a housing into which mixed gas of unburned gas and engine oil is introduced from a crank case;
   a centrifuge mounted in the housing and generating centrifugal force to the mixed gas to thereby separate the engine oil from the mixed gas; and
   a filter separator mounted in the housing and filtering the engine oil in the mixed gas,
   wherein the centrifuge includes an induction rib formed in the housing so as to induce the mixed gas toward an inner side wall surface of the housing, and
   wherein the induction rib includes:
      a straight rib extending from an introduction pipe attached to the housing toward the inner side wall surface of the housing; and
      a curved rib extending from the straight rib so as to be curved to thereby form a spiral shape together with the straight rib.

2. The oil separator according to claim 1, wherein the housing includes:
   a separation function part in which the centrifuge and the filter separator are mounted; and
   a discharge part discharging the unburned gas separated from the mixed gas.

3. The oil separator according to claim 2, wherein the separation function part has a cylindrical shape and includes:
   an introduction pipe attached to a side surface of the separation function part so that the mixed gas is introduced;
   an oil discharge pipe attached to a bottom surface of the separation function part so that the engine oil separated from the mixed gas is discharged; and
   a flow guide inducing the unburned gas separated from the mixed gas to the discharge part and protruding toward the inside of the separation function part.

4. The oil separator according to claim 2, wherein the discharge part has a box shape in which an upper surface thereof is opened and includes:
   a curved path extending from a flow guide formed in the separation function part toward the upper surface of the discharge part;
   a gas discharge pipe having one end protruding from a side surface of the discharge part, the one end connected to the curved path; and
   a diaphragm positioned on the upper surface of the discharge part so as to allow the curved path and the gas discharge pipe to be in communication with each other or be blocked from each other.

5. The oil separator according to claim 4, wherein the discharge part further includes a cap fastened to the opened upper surface so as to fix a position of the diaphragm.

6. The oil separator according to claim 1, wherein the induction rib further includes a through hole formed to penetrate therethrough in a width direction of the induction rib so that the engine oil separated from the mixed gas is moved to an oil discharge pipe provided in the housing by friction with the inner side wall surface of the housing.

7. The oil separator according to claim 1, wherein the filter separator includes:
   a cover plate body having an edge connected to an inner side wall surface of the housing; and
   a plurality of fine through holes formed in the cover plate body.

8. The oil separator according to claim 7, wherein the cover plate body includes a central part protruding in a truncated cone shape,
   the central part being non-parallel to the inner side wall surface, and the edge extending while being curved to thereby be parallel with the inner side wall surface.

9. An oil separator comprising:
   a housing into which mixed gas in which unburned gas and engine oil are mixed with each other is introduced into a side surface;
   a centrifuge provided in the housing so as to generate centrifugal force to the mixed gas to primarily separate the engine oil;
   a filter separator provided in the housing so as to be positioned on an upper end of the centrifuge and secondarily separating the engine oil from the mixed gas from which the engine oil is primarily separated; and
   a diaphragm provided in the housing so as to open and close a gas discharge pipe discharging the mixed gas from which the engine oil is separated through the centrifuge and the filter separator to the outside of the housing,
   wherein the centrifuge includes an induction rib formed in the housing so as to induce the mixed gas toward an inner side wall surface of the housing, and
   wherein the induction rib includes:
      a straight rib extending from an introduction pipe attached to the housing toward the inner side wall surface of the housing; and
      a curved rib extending from the straight rib so as to be curved to thereby form a spiral shape together with the straight rib.

10. The oil separator according to claim 9, wherein the housing includes an oil discharge pipe discharging the engine oil from the housing to an oil pan provided in an engine, and the gas discharge pipe is connected to an intake manifold.

11. An oil separator comprising:
    an oil discharge pipe extending along a first direction;
    a gas discharge pipe extending along a second direction different to the first direction;
    a separation chamber, extending along the first direction, including a first through hole connected to the oil discharge pipe and a second through hole connected to the gas discharge pipe;
    an introduction pipe protruding from a side wall of the separation chamber;
    a centrifuge disposed in the separation chamber and including a plurality of ribs protruding from a bottom wall in which the first through hole is formed; and
    a filter including a plurality of fine through holes and disposed between the centrifuge and the second through hole.

12. The oil separator according to claim 11, further comprising a curved flow path connected between the second through hole of the separation chamber and the gas discharge pipe.

13. The oil separator according to claim 12, further comprising a movable diaphragm positioned between the gas discharge pipe and the curved flow path and selectively opening and closing a flow path between the curved flow path and the gas discharge pipe.

14. The oil separator according to claim 13, further comprising a cap fixing a position of the movable diaphragm.

15. The oil separator according to claim 11, further comprising a flow guide protruding from an edge of the second through hole of the separation chamber toward the filter.

16. The oil separator according to claim 11, wherein:
 the plurality of ribs at least include a straight rib extending from the side wall of the separation chamber from which the introduction pipe protrudes, and a curved rib extending from the straight rib and forming a spiral shape together with the straight rib, and
 the first through hole of the separation chamber is surrounded by the plurality of ribs.

17. The oil separator according to claim 11, wherein the filter includes:
 a cover plate body having an edge connected to the side wall of the separation chamber and a central part having a truncated cone shape; and
 the plurality of fine through holes penetrating through the cover plate body along directions intersecting the side wall of the separation chamber.

18. The oil separator according to claim 11, wherein the introduction pipe protrudes from a portion of the side wall which is closer to the first through hole than the second through hole of the separation chamber.

* * * * *